(12) United States Patent
Malmin

(10) Patent No.: US 8,466,925 B2
(45) Date of Patent: Jun. 18, 2013

(54) IMAGE PRODUCTION IN IMAGING SYSTEMS EMPLOYING A MULTIFOCAL COLLIMATOR

(75) Inventor: Ronald E. Malmin, Chicago, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 1006 days.

(21) Appl. No.: 12/504,644

(22) Filed: Jul. 16, 2009

(65) Prior Publication Data

US 2010/0085369 A1 Apr. 8, 2010

Related U.S. Application Data

(60) Provisional application No. 61/081,195, filed on Jul. 16, 2008.

(51) Int. Cl.
*G06F 13/00* (2006.01)
*G21K 1/02* (2006.01)

(52) U.S. Cl.
USPC ........................................ 345/536; 250/363.1

(58) Field of Classification Search
USPC .................. 345/530, 536, 544; 250/363.1
See application file for complete search history.

(56) References Cited

U.S. PATENT DOCUMENTS

| | | | | | |
|---|---|---|---|---|---|
| 4,820,924 | A | * | 4/1989 | Hsieh | 250/363.1 |
| 5,722,405 | A | * | 3/1998 | Goldberg | 600/407 |
| 2004/0015075 | A1 | * | 1/2004 | Kimchy et al. | 600/424 |

* cited by examiner

*Primary Examiner* — Joni Richer
(74) *Attorney, Agent, or Firm* — Peter Kendall

(57) ABSTRACT

In an imaging system employing a multifocal collimator, displaying an image. Framing an event stream into a first buffer. Mapping each first buffer bin to a bin of each of a normalization buffer and a count buffer. Normalization buffer and count buffer are the same dimension. First buffer bins correspond to normalization buffer bins and the count buffer bins such that geometric distortion from the multifocal collimator is substantially reduced. The value of each normalization buffer bin corresponds to the quantity of corresponding first buffer bins corresponding to that normalization buffer bin, and a value of each count buffer bin corresponds to total counts of the one or more of the first buffer bins corresponding to the each count buffer bin. Determining an updated image as the ratio of the values of count buffer bins to the normalization buffer bins. Displaying an image as a function of the updated image.

4 Claims, 3 Drawing Sheets

IMAGE PRODUCTION IN IMAGING SYSTEMS EMPLOYING A MULTIFOCAL COLLIMATOR

CROSS REFERENCE TO RELATED APPLICATIONS

The present application claims the priority benefit of pending U.S. Provisional Patent Application No. 61/081,195 titled "Simultaneous Correction for Geometric and Intensity Distortions in Multifocal Collimated Images," filed Jul. 16, 2008 (the "Provisional Application"). The complete disclosure of the Provisional Application is hereby incorporated herein by reference in its entirety.

FIELD OF THE TECHNOLOGY

The technology disclosed herein relates to image data processing. In particular, the technology relates to on-line, e.g., live time or near-live time, production of a remapped normalized image from data obtained using a multifocal collimator.

BACKGROUND

It is desirable to produce live-time or near live-time images from imaging systems employing a collimator that is non-parallel in one or more axes and therefore produces event stream data that if left uncorrected would produce a distorted image. Less-distorted live-time or near live-time images are useful, e.g., for patient position monitoring in medical imaging. Typical methods for producing undistorted images from systems employing such collimators are processor-intensive and introduce latency not desirable for uses such as patient position monitoring.

The multifocal collimator is a two dimensional focusing collimator consisting of a variable focal length "fan" in each direction. The focal length for a location [x,y] on the collimator focal plane is described by a polynomial function of x and y. Planar images from such a collimator can be highly distorted from those of the same object viewed with parallel collimation, leading to difficulty in clinical patient setup. The distortions from use of a multifocal collimator can be both geometric distortions (imaging points in a location different from a parallel collimator) and intensity distortions (more or fewer counts imaged for a given point source depending on its location in the field of view).

SUMMARY

The technology includes systems and methods for displaying an image. In some embodiments, the technology receives an event stream from other components of an imaging system. The event stream is framed into a first buffer. Each bin of the first buffer is mapped to a corresponding bin of each of a normalization image buffer and a count image buffer. The normalization image buffer and the count image buffer are the same dimension. One or more bins of the first buffer correspond to each bin of the normalization buffer such that the geometric distortion introduced by the multifocal collimator is substantially reduced. Bins of the first buffer correspond to bins of the count buffer in the same fashion. The value of each normalization buffer bin corresponds to the quantity of the first buffer bins mapped to that normalization buffer bin. The value of each count buffer bin corresponds to total counts of the first buffer bins corresponding to that each count buffer bin. An updated image is determined corresponding to the ratio of the values of the count buffer bins to the values of the normalization buffer bins. An image is displayed, as a function of the updated image.

In some embodiments, the displayed image is a summation of a previous image weighted by a persistence factor and the updated image.

The technology includes systems of the method described above, along with patient position monitors and computer program products implementing the methods.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

Figure 1:
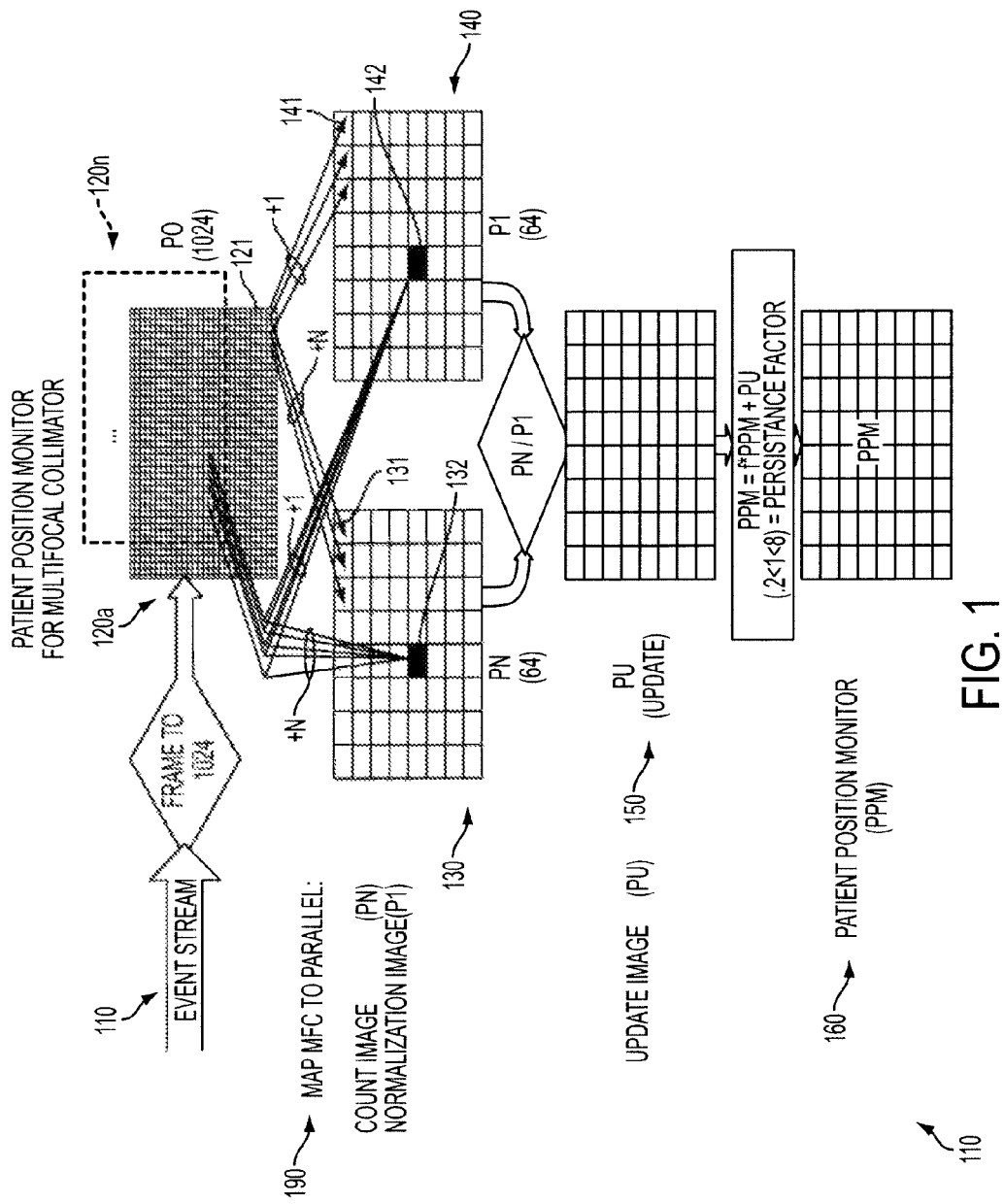
FIG. 1 depicts a process for intensity distortion mitigation and geometric distortion mitigation in image data obtained using a multifocal collimator.

FIG. 1 depicts a process for mitigation of intensity distortion and geometric distortion from data used to prepare an image in an imaging system employing a multifocal collimator. Although the technology is disclosed herein in the context of a multifocal collimator, the technology is applicable to imaging systems employing any collimator. An event stream 110, e.g., from a detector of an imaging system, is binned into one of one or more first buffers 120a-120n. An individual first buffer is referred to herein as P0. Preferably, at least two first buffers are used, and the first buffers are high spatial resolution buffers. Preferably, the first buffers are filled one at a time from the full width event stream 110. FIG. 1 illustrates the buffers 120a-120n as 1024×1024 buffers.

After a first buffer, e.g., 120a, is filled, and while subsequent first buffers fill, the full first buffer, e.g., 120a, is re-binned into two second smaller buffers 130, 140. In FIG. 1 the second buffers are shown as 64-by-64 buffers P1 140, a normalization buffer, and PN 130 a count buffer, for purposes of illustration. A 4-to-1 reduction in overall size, e.g., to a pair of 256×256 second buffers, is more typical and preferred.

Figure 2:
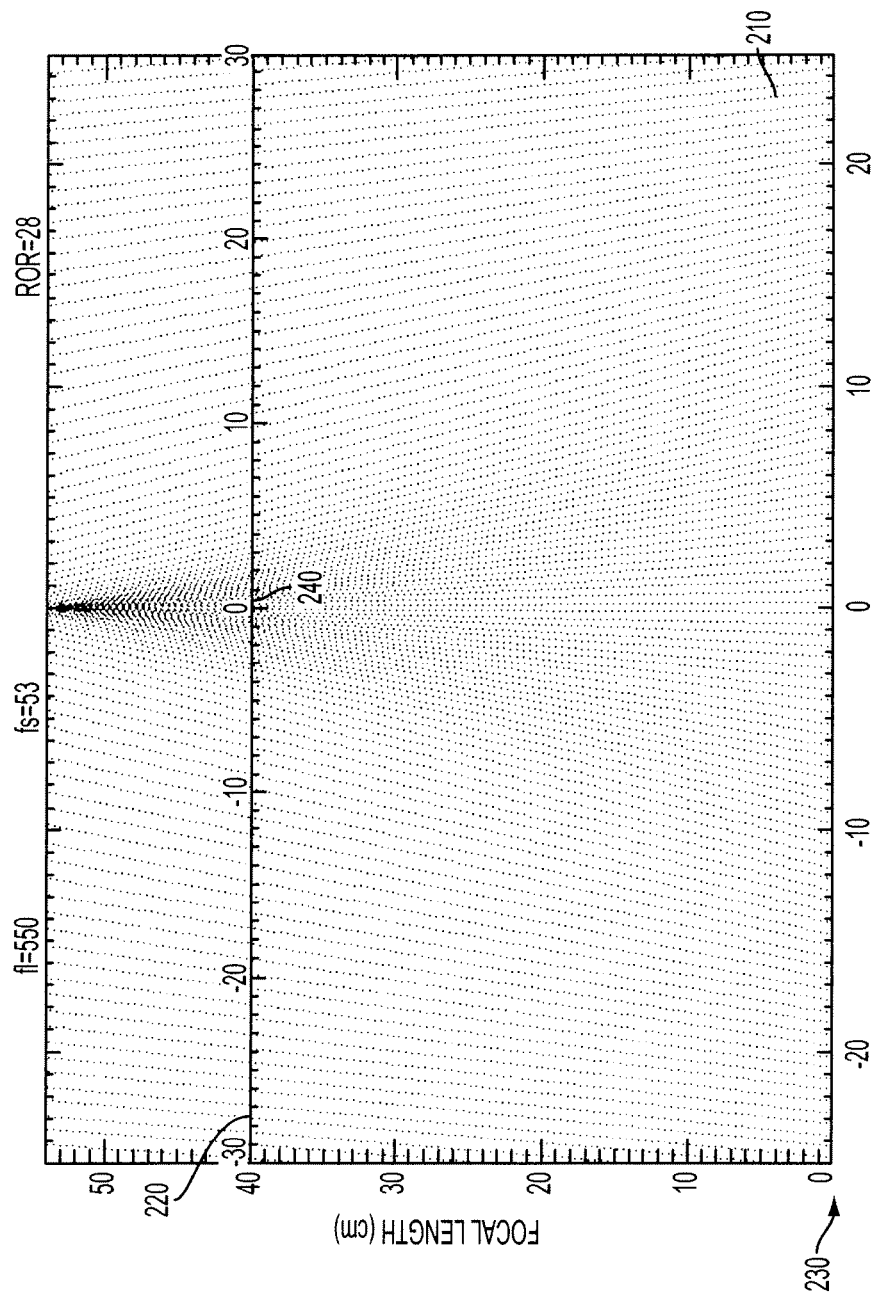
FIG. 2 illustrates certain aspects of a technique used for mapping between a first buffer of the technology and a pair of second buffers.

All bins of P0 are mapped 190 to each of the second buffers P1 and PN. For each second buffer, one or more bins from P0 are mapped to a second buffer bin based on the local magnification of the collimator hole. The mapping of P0 to P1 and PN requires knowledge of the collimator magnification pattern as a function of distance from the collimator, and transverse position over the collimator. This depends on the construction of the collimator, e.g., the direction in which the holes point, over the surface of the collimator. This pattern is simple for standard converging collimators (e.g., fan beam, cone-beam). Although more complicated for the multifocal collimator, the magnification is readily calculated using standard techniques by those skilled in the art. This can be accomplished by an additional number of techniques, not discussed here, but known to those skilled in the art of the technology. In preferred embodiments, the mapping from P0 to P1 and PN is pre-calculated in a lookup table as known to those skilled in the art of the technology. FIG. 2 illustrates a basis for such a lookup table. Dotted lines, e.g., 210 represent lines of response caused by the multifocal collimator. Mapping for an object 40 cm away is shown at line 220. Two (2) lines per centimeter are drawn at the collimator as indicated at baseline 230 representing a collimator hole or "pixel." Lines from the collimator are mapped toward the center at 40 cm, i.e., 240. Fewer lines map a pixel at the collimator to either edge. In practice this effect can be seen in each dimension of the collimator.

For example, since multifocal collimators focus more collimator holes on the central area of the imaging subject and fewer collimator holes on the edges of the imaging subject, a bin at the edge of first buffer P0, e.g., bin 121 (generally indicated), can correspond to a single bin, e.g, bin 131 at the edge of second buffer PN, and a single bin 141 at the edge of second buffer P1. Bins near the center of P0, e.g., bins 122-126 (typically contiguous, but not shown as such in FIG. 1) can correspond to a single bin, e.g., bin 132, near the center of PN, and a single bin, e.g., bin 142, near the center of P1.

P1 is an increment +1 image, e.g., the value in a particular bin of P1, e.g. bin 142, is equal to the number of bins from the first buffer P0 that are mapped to the particular bin, e.g., in FIG. 1 five (5) bins from P0 are mapped to bin 142 in P1. Each bin in the PN buffer, e.g., bin 132, is incremented by the total counts, N, in the P0 bins mapped to that PN buffer bin. For example, if each of the five (5) P0 bins that map to P1 bin 142 contained twenty (20) counts, then the value in corresponding PN bin 132 would be 100.

When all P0 bins are processed the intensity-normalized update image, PU 150, is computed as the bin-by-bin ratio PU=PN/P1. The update image, PU 150, can then be accumulated in a distortion corrected image.

If a "live" patient position monitor image is desired (PPM 160 in FIG. 1), the update image PU 150 can be added to a persistence fraction, f, of the current PPM image, $PPM_0$. The persistence fraction is typically between 0.1 and 0.8 depending on the desired persistence time.

Figure 3:
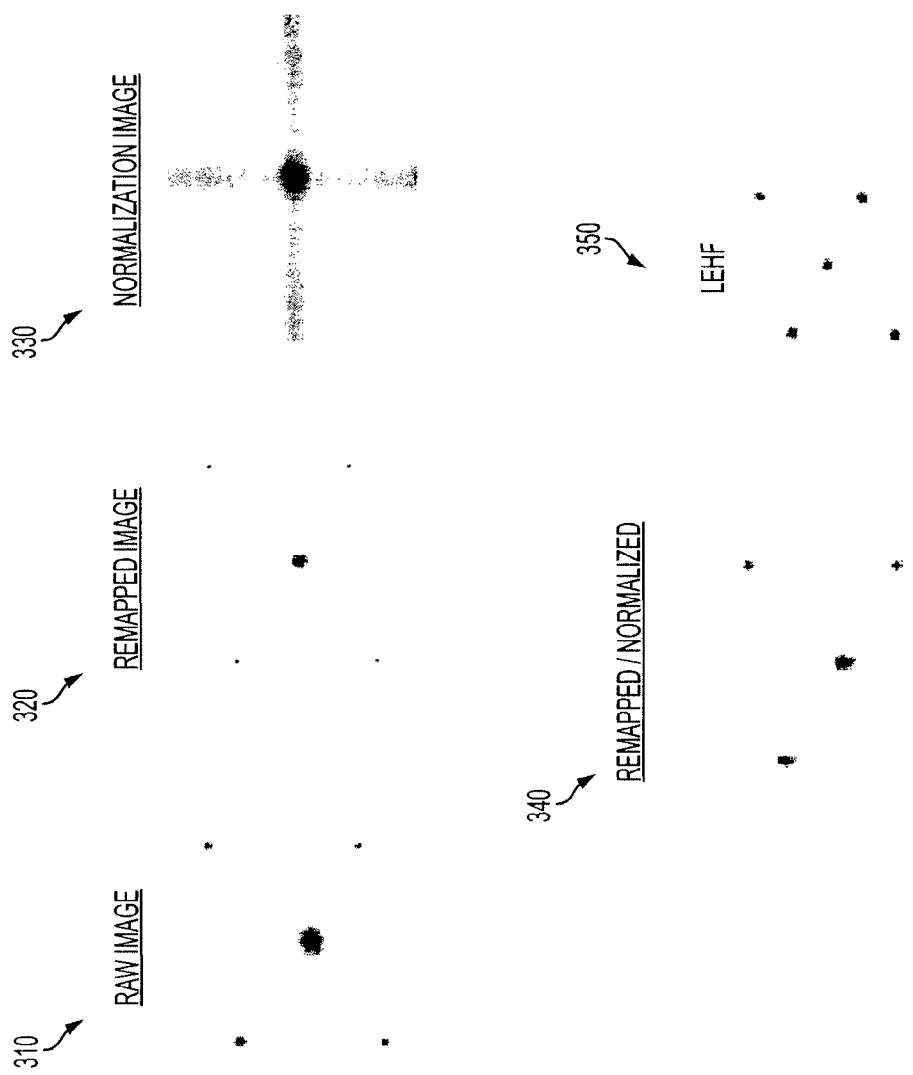
FIG. 3 illustrates operation of embodiments of the present technology on a simple test image, e.g., five (5) point sources.

FIG. 3 shows a simple test image, five (5) point sources. Column 1 310 is the raw P0 image; column 2 320 the mapped, geometric-distortion corrected image PN (note the high intensity of the center, high magnification, point); column 3 330 is the normalization image P1; column 4 340 is the intensity-corrected image PPM. Column 5 350 is the corresponding Low Energy High Resolution (LEHR) beam image.

The imaging systems in general, and the present technology specifically, can take the form of hardware, software or both hardware and software elements. In some embodiments, the technology is implemented in software, which includes but is not limited to firmware, resident software, microcode, an FPGA or ASIC, etc. In particular, for real-time or near real-time use as in a patient position monitor, an FPGA or ASIC implementation is desirable.

Furthermore, the imaging systems in general, and the present technology specifically, can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of a physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing program code and for executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modems and Ethernet cards are just a few of the currently available types of network adapters.

The invention claimed is:

1. In an imaging system employing a multifocal collimator, a method for displaying an image, the method comprising:
in a data processing system of the imaging system:
receiving an event stream;
framing the event stream into a first buffer;
mapping each bin of the first buffer to a corresponding bin of each of:
a normalization image buffer and
a count image buffer,
wherein:
the normalization image buffer and the count image buffer are the same dimension,
one or more bins of the first buffer correspond to each bin of the normalization buffer such that the geometric distortion introduced by the multifocal collimator is substantially reduced,
bins of the first buffer correspond to bins of the count buffer in the same fashion as bins of the first buffer correspond to bins of the normalization buffer,
a value of each normalization buffer bin corresponds to the quantity of the one or more of the first buffer bins corresponding to the each normalization buffer bin, and
a value of each count buffer bin corresponds to total counts of the one or more of the first buffer bins corresponding to the each count buffer bin;
determining an updated image corresponding to the ratio of the values of the count buffer bins to the values of the normalization buffer bins; and
displaying an image as a function of the updated image.

2. The method of claim 1, wherein displaying an image as a function of the updated image comprises displaying the updated image.

3. The method of claim 1, wherein displaying an image as a function of the updated image comprises displaying an image as a weighted summation of a previously displayed image and the updated image.

4. The method of claim 3, wherein displaying an image as a weighted summation of a previously displayed image and the updated image comprises displaying an image as the summation of the updated image and a persistence factor times the previous image.

* * * * *